Patented Mar. 18, 1941

2,235,315

UNITED STATES PATENT OFFICE 2,235,315

PRESERVATION OF COFFEE

John C. Donnelly, New York, N. Y.

No Drawing. Application August 12, 1939,
Serial No. 289,777

3 Claims. (Cl. 99—152)

This invention relates to a new and useful method for the preservation of roasted coffee and to a novel form of preparing and packaging coffee for preservation and mechandising.

Objects and advantages of the invention will be set forth in part hereinafter and in part will be obvious herefrom, or may be learned by practice with the invention, the same being realized and attained by means of the steps and combinations pointed out in the appended claims.

The invention consists in the novel steps, methods, procedures, combinations and improvements herein described.

The invention is directed to providing a method and means for maintaining roasted coffee in fresh condition substantially indefinitely by preventing the occurrence of those factors which cause or accompany rancidity and staleness. It is generally understood that staleness and rancidity in coffee are caused by oxidation of aromatic oils and esters which are found in the freshly roasted coffee bean. At normal pressures and temperatures roasted coffee generates and gives off very large quantities of carbon dioxide gas. The presence of the gas on and about the coffee beans or particles acts as a partial seal against oxidation, the heavier $CO_2$ clinging to the coffee and excluding oxygen. Research has shown that rancidity and staleness of roasted coffee appear to be a function of the emanation of $CO_2$. A curve showing the decreasing amounts of residual gas in roasted coffee over a period of time after roasting is almost paralleled by the curve of freshness and flavor, while staleness or rancidity develops after the quantity of gas has fallen off to approximately 10% and beginning at that point staleness develops substantially as the reciprocal of the gas emanation curve.

It is also known that the freshness of coffee varies inversely with the amount of surface exposed. Thus roasted coffee beans remain fresh for a considerably longer time than ground coffee, apparently because in the bean a lesser area is exposed to oxidation. Furthermore, a greater amount of gas is naturally dissipated from ground coffee than from a bean, which to some extent acts as a natural container for $CO_2$. When the ground coffee is subjected to low pressure, as in a vacuum can or exhausted atmosphere, the gas is drawn off or separated from the coffee to a greater extent than in atmospheric pressure, so that when the can is opened and the contained gas escapes, the remaining coffee is apt to get stale much more rapidly because of the loss of a relatively great amount of $CO_2$ gas.

Objects of the invention are to preserve freshness and aroma and flavor of coffee so that it will retain substantially indefinitely those qualities to the extent existing immediately after roasting; to prevent oxidation and resulting staleness and rancidity, primarily by preventing the evolution and dissipation of $CO_2$ from the coffee; to return to and hold in the coffee much of the aroma and volatile gases liberated during roasting; and to prevent rancidity or other deterioration of the coffee which may come from bacterial action or the like. Other objects of the invention are to reduce oxidation by reducing the area of the coffee exposed to the atmosphere; to save bulk in handling and storing coffee; and to provide a convenient form for packaging, merchandising and utilizing preserved coffee, both in bulk and in retail. Furthermore, a more tasty brew and one containing a higher concentration of coffee is obtained.

The foregoing objects of the invention are preferably attained by subjecting the coffee immediately after roasting to a very low temperature which causes the gases liberated during roasting to be re-absorbed by the roasted coffee. The coffee may be ground while in the low temperature condition and little or no loss of gas and flavor will occur. By maintaining the coffee at low temperatures thereafter, its freshness will be substantially unchanged until the moment of brewing. The refrigerated coffee is also subjected to a very high degree of compression, thereby to compact the chilled grains into cakes or blocks of relatively small volume. These compressed cakes are maintained at low temperatures during subsequent handling, thereby providing coffee in a form having a relatively small surface exposed and in which the low temperature prevents substantial emanation of gas. Hence oxidation and consequent rancidity and staleness are substantially prevented and the coffee is brought to the consumer in practically its original state of freshness. When a cake of the compressed and chilled coffee is dropped into boiling water for brewing, all the original aroma and volatile gases which are immediately liberated from the cake of coffee pass directly into the brewing water which thus receives and absorbs the highest possible amount of flavor and aroma, while the brew will be of higher concentration or specific gravity per unit of coffee used.

The chilled coffee is compressed into any desired shape or form of cake adapted for convenient handling. Thus the cakes may be thin and flat and formed in sections which may be broken off in units corresponding to say one cup, one pound, or any other desired measure. Furthermore, by so forming the chilled coffee, it may be conveniently wrapped in foil or other suitable packaging material which further insulates it from the atmosphere, this aiding in maintaining its freshness and preserved condition.

Referring now in detail to the present preferred embodiment of the invention, the process comprises roasting the coffee beans in any suitable roaster to the point of roasting desired for the particular product. The freshly roasted beans are then substantially immediately moved to a refrigerating chamber where they are chilled as rapidly as possible to a low temperature, preferably below 10° F. and preferably in the range from 10° to 100° below 0° F.

The gases given off from the coffee during roasting and those clinging to and about the roasted beans and entrained therewith are, by virtue of the drop in temperature, caused to contract and to some extent are automatically recaptured by the beans. In addition, gases given off during roasting may be transferred by suitable conduits from the roasting chamber to the chilling chamber, there to undergo the chilling action and thus add to the richness of the atmosphere in which the coffee is chilled and thereby increase the opportunity for the coffee to recapture these surrounding gases.

The next step in the preferred operation of my process is to grind the coffee to the desired fineness while maintaining it in the chilled state. For this purpose the grinding rollers and other parts of the grinding mechanism are preferably prechilled or are maintained in the low-temperature atmosphere at all times so that the grinding will not substantially raise the temperature of the refrigerated beans.

As the next step, the cold ground coffee is subjected to a relatively high compression to thereby compact it into cakes or blocks having a volume substantially less than that of the loosely packed, ground coffee and preferably to a volume no more than one-half that of the loosely packed grounds. For this operation the coffee is preferably packed into chilled dies and subjected to compression sufficient to reduce it to the desired volume and to cakes or blocks of the desired size. The amount of compression and volume reduction and also the size and shape of the cakes will depend upon the particular wholesale handling and/or retail use to which the coffee is intended to be put. A relatively low compression of the order of 1,000 to 5,000 pounds per sq. in. will produce a substantial reduction in volume, reducing the voids between the grains and thereby eliminating oxidating surfaces and the presence of air. The cake so formed will be fairly friable or crumbly, especially on the surface, and can be spooned from a container. Consequently this amount of compression appears to be best adapted for production of bulk packages of coffee in volumes for one pound or one-half pound cakes where the coffee is to be taken spoonfuls at a time from the container. When it is desired to produce a greater volume reduction and a more compact form of cake, pressures from 10,000 to 25,000 pounds per sq. in. may be employed. These heavier pressures produce cakes or blocks which are very closely integrated and have a fairly smooth and solid surface, the grains themselves being compacted as well as eliminating voids therebetween. Thus when it is desired to produce individual thin cakes or wafers of coffee such as might be used to make one or a few cups of brewed coffee, the heavier pressures are preferably employed. It is also possible and desirable to compress the chilled coffee into relatively flat, thin blocks which may be scored or provided with lines of weakness to sub-divide same into smaller sections which may be individually broken off from the main block, substantially in the manner now employed with cakes of milk chocolate. Such sub-sections may be used for purposes for measurement for the brewing of a desired amount of coffee while the remainder of the cake may be retained for later use.

The compressed chilled coffee is preferably packaged by wrapping in foil or other material which will act as a heat insulator and facilitate maintenance of a low temperature after packing. Thus individual wafers may be separately wrapped in foil and packaged together in a box or carton, while larger bulk units may be separately wrapped and/or packaged in suitable cartons or the like.

From the time the coffee is first chilled after roasting until it is delivered to the individual consumer, it is preferably maintained at the low temperatures indicated above. By so keeping the coffee cold, any substantial emanation of gas therefrom is prevented and consequently the beginnings of oxidation and rancidity or staleness are inhibited. Thus the coffee is delivered to the consumer in substantially the state of freshness and goodness it had when roasted, and that state can be maintained substantially indefinitely by the maintenance of low temperatures. Furthermore, the consumer can additionally prolong the state of freshness by keeping the coffee in the ice-box or other domestic refrigerator at sub-normal temperatures which will materially prolong the inhibition of rancidity and staleness. However, even when the chilled and compressed coffee is kept in the open atmosphere at normal temperatures, the progress of oxidation and staleness are materially reduced because of the small surface area exposed and because the compact cake acts to a considerable extent as its own insulator, thus deferring the rise in temperature within the cake for a substantial time.

While in the preferred form of the invention the coffee is ground before compacting by pressure, it is also contemplated to compress the freshly roasted beans into integral blocks or cakes by pressure alone without an intermediate grinding operation. With sufficient pressure the beans will be crushed to a point whereupon brewing the bean will disintegrate into particles sufficiently small to release an adequate amount of color and flavor into the brew.

In one preferred form of packaging the coffee in accordance with my process, the container, such as a cardboard carton preferably lined with foil, is fitted into or seated directly in the mould and filled with chilled ground coffee to be compressed. The plunger, shaped to conform to the outline of the mould and container is then forced into the top of the container and compresses the coffee directly in the container to the degree of compactness and volume reduction desired. Thus the coffee may be packed and compressed in household or retail containers in relatively simple and inexpensive manner, particularly where the degree of compression is such as to leave the coffee in a relatively crumbly condition so that it may be spooned out of the container.

The invention in its broader aspects is not limited to the specific steps and procedures described but departures may be made therefrom within the scope of the accompanying claims without departing from the principles of the invention and without sacrificing its chief advantages.

What I claim is:

1. Process of preserving coffee which includes the steps of roasting coffee, reducing the temperature of the roasted coffee substantially below the freezing point of water and compressing the coffee to a compact, self-sustaining block while the coffee is at said low temperature.

2. Process of preserving coffee which includes the steps of roasting coffee, reducing the temperature of the roasted coffee substantially below the freezing point of water, grinding the coffee while maintaining said low temperature and compressing the coffee to a compact, self-sustaining block while the coffee is at said low temperature.

3. Process of preserving coffee which includes the steps of roasting coffee, reducing the temperature of the roasted coffee substantially below the freezing point of water in the presence of the roaster gases, grinding the coffee while maintaining the coffee at said low temperature and compressing the coffee to a compact, self-sustaining block while the coffee is at said low temperature.

JOHN C. DONNELLY.